United States Patent Office 3,291,703
Patented Dec. 13, 1966

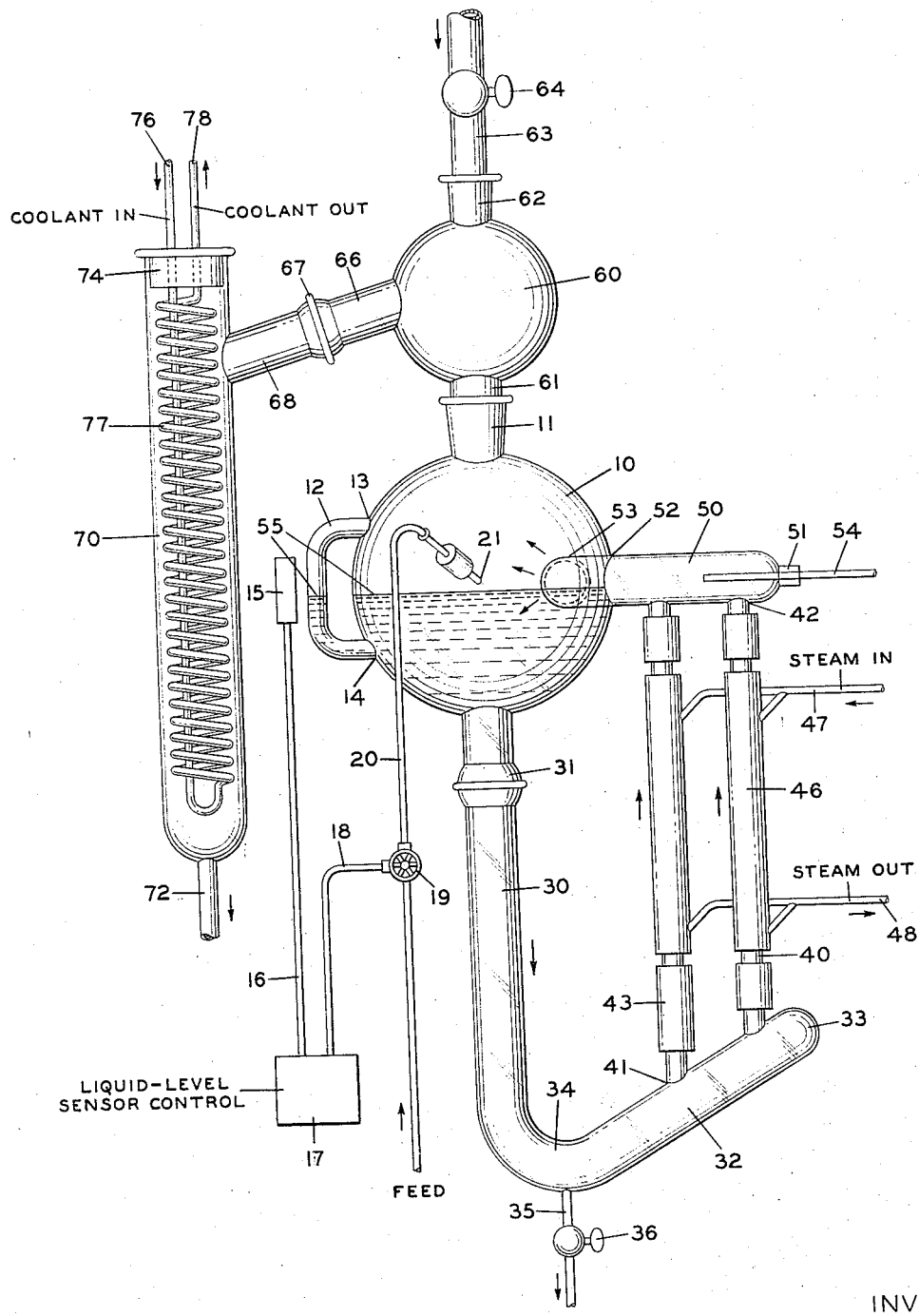

3,291,703
AUTOMATIC CYCLIC VACUUM STILL
William Dvonch, Radnor, and Harvey E. Alburn, West Chester, Pa., assignors to American Home Products, New York, N.Y., a corporation of Delaware
Filed July 31, 1963, Ser. No. 298,934
1 Claim. (Cl. 202—181)

This invention relates to an automatic cyclic still. More particularly this invention relates to an automatic cyclic vacuum still, particularly adapted to concentrate labile materials.

The concentration and recovery of highly unstable or labile chemical reaction products without degradation or substantial loss from the solvents in which such products are normally produced, is the object of a wide variety of procedures and apparatus.

Most of the more economical approaches to the problem of concentration of unstable materials have undesirable features. In the conventional distillation technique, comparatively high temperatures are present which often result in degradation of the desired product. The freeze-drying technique, while quite satisfactory from the point of view of avoiding product degradation and providing an adequate product yield, is time consuming to carry out and requires a substantial investment in apparatus.

It is accordingly an object of the present invention to provide a new and improved, inexpensive cyclic still, particularly adapted to concentrate unstable materials without degradation.

Another object of this invention is to provide an apparatus that permits one, in contrast to freeze-drying, to crystallize a labile material out of solution and obtain a product free of materials left in the mother liquor.

It is another object of the present invention to provide an automatic cyclic still which effects recovery of labile materials at low temperature without product degradation and at high yield, without the necessity of constant attention and supervision by an operating technician.

It is still a further object of the present invention to provide an automatic cyclic vacuum still which is particularly adapted to effect concentration of a wide variety of materials from dilute solutions of the same at low temperature without the requirement of continuous attention to product or waste receivers and with minimum consumption of utilities.

These and other objects and advantages are provided by the apparatus of the present invention, which in its broadest aspect, comprises a central reservoir vessel having a fluid inlet line associated therewith and a fluid withdrawal line positioned in the bottom of the vessel, the latter terminating in an upwardly inclined end portion to which is connected at least one jacketed, fluid circulation inducing line. The fluid circulation line is integral with and in fluid communication with the inclined portion of the draw off line at its lower end and a fluid return line at its upper end. The latter is fixed to the side of the central reservoir vessel and in communication therewith at the point of attachment and closed at the opposite end. The return line in combination with the draw off and circulation lines thus provides a continuous fluid cycle conduit from the reservoir vessel and return. A vapor condenser is provided in the upper portion of the reservoir vessel adapted to receive and condense vapors delivered thereto from the reservoir vessel as well as providing a means for connecting the still to a vacuum source. A vertically positioned U-shaped liquid level side tube is provided on the reservoir vessel which together with an associated sensing device controls through a solenoid valve, the delivery of feel to the reservoir vessel.

In operation, heat applied to the fluid in the upper portion of the circulation line, such as by introducing steam into the jacket, results in a vaporization of a portion of liquid in the circulation line, with vapor moving into the return line together with concentrated liquid, the cycling of which is induced by the vaporization in the circulation line. Vapor, constituting the undesired component of the liquid feed mixture, delivered to the reservoir vessel by the return line passes to the condenser, with the desired liquid being concentrated moving to the reservoir vessel for further cycling and concentration. As the liquid level in the reservoir vessel drops due to concentration, i.e., vapor removal, additional material is automatically added to the reservoir vessel by the U-tube liquid level sensing and control device described.

As will be readily apparent, the cyclic still of the present invention permits low temperature concentration of solution containing labile materials in an automatic and most inexpensive manner. The sensing aspect avoids the normally required, continuous attention of an operator and the unique induction cycle provided by the circulation line provides a most effective manner for the concentration of unstable materials without the requirement of expensive cycling pumps and control equipment normally associated with distillation apparatus designed to recover highly labile chemicals from solutions containing very small amounts of the same.

Reference now to the drawing and the description which follows will provide a better understanding of the apparatus of the present invention and to the manner in which it operates.

In the drawing, numeral 10 designates the central reservoir vessel having in the upper part thereof a neck 11 adapted to receive a connecting tube 61 positioned in the bottom of vapor collecting vessel 60. Vessel 10 is shown for convenience as being spherical in shape and is conveniently constructed of glass or other suitable material such as metal. The latter material is preferred when the still is constructed in sizes larger than for laboratory use, such as for example in semicommercial or commercial installation. While the spherical shape is generally preferred, it should be recognized that vessel 10 can assume other shapes such as a multisided or cylindrical shape if desired in which event other components of the still as hereinafter described will require appropriate modification and alteration.

At one side of vessel 10, a U-shaped side tube 12 is vertically positioned, integral and in fluid communication with vessel 10 at 13 and 14. U-tube 12 is of transparent material such as glass and shows or indicates the fluid level in vessel 10. The connection of tube 12 at 14 can if desired be made at a point in the draw off leg 30 under which circumstances U-tube 12 is equally as operative and useful. Positioned exteriorly of tube 12 is a liquid level sensor 15 connected by conduit 16 to liquid-level sensor control 17. The latter in response to a signal from sensor 15 controls through conduit 18 valve 19 in feed line 20. Valve 19 is preferably a solenoid control valve by which a level of liquid in vessel 10 is automatically maintained. Line 20, it will be noted, terminates in a top entry injector 21, preferably above the normal liquid level maintained in vessel 10 such as at 55. While such positioning of injector 21 in vessel 10 in the area above the liquid level, is not critical to the functioning of the apparatus, it is preferred, since under the vacuum which is maintained in the system, dissolved gases and more volatile materials "pop" off on introduction with the feed and are conveniently removed by way of vapor collector 60 and condenser 70.

In the bottom of vessel 10, a liquid draw off line 30 is provided, connected to vessel 10 by a suitable connecting link 31. The latter is not essential and draw off line 30 can be made integral with vessel 10 in a single unitary and continuous construction if desired. Draw off line 30 extends downwardly from vessel 10 and terminates in an upwardly inclined end portion 32, the terminal end of which is closed at 33. The curve in draw off line 30, noted at 34, may vary from about 5 to about 35° as desired. A somewhat lesser curve at 34 of about 15 to 25° is preferred, to assist in fluid circulation as hereafter described and provide a convenient means of product withdrawal by way of product line 35 under control of valve 36. Connected to the upwardly inclined end portion 32 is a liquid circulation line 40, which is made integral with terminal portion 32 at 41. Line 40 extends vertically upward and terminates at the return line 50. Line 40 can be fashioned as a single connecting line or in several segments suitably connected such as at 43. Line 40 may also exist in parallel form in a plurality of two or more lines such as are shown in the drawing. The number of circulating inducing lines 40 will of course depend on the size and capacity of the apparatus. The circulation inducing lines 40 are heat jacketed as at 46, to provide a means for heating the fluid in lines 40. If steam is used to provide the desired heat in jacket 46, it is introduced in line 47 and withdrawn in line 48. Alternatively, electric heating coils can be used in heating line 40 if desired.

As indicated, circulation inducing and distillation lines 40 terminate at the fluid return line 50 and are integral and in fluid communication therewith at 42.

Return line 50 is generally horizontal, and positioned when vessel 10 is in spherical shape, at the approximate diameter of the vessel, perpendicular to the circulation lines. Line 50 is sealed at the outer end 51, and is in fluid communication with vessel 10 at the inner end 52. If desired, return line 50 may be extended into the interior of vessel 10 as shown at 53, to provide a better delivery of the vapor and liquid to the interior of vessel 10. Additionally, if desired, a thermometer 54 may be placed in sealed end 51 to measure distillation temperature.

Vapors produced by the heating of the fluid in the circulation line 40 rise upwardly passing through return line 50 and the vessel 10, from whence they move upwardly into vapor collecting vessel 60, and to condenser 70 by way of line 66. Vapor collecting vessel 60 is connected to condenser 70 by a suitable line 66, which may be of unitary construction or of segmented construction and joined at 67 with inlet tube 68 of condenser 70.

Condenser 70 is a conventional vapor condenser, vertically positioned to receive vapor from vessel 60 and condense the same by means of a coolant introduced in line 76, circulated in coil 77 and removed by line 78. To insure and maintain vacuum in the still system, a seal cap is provided at 74 in the top of condenser 70. Waste products are withdrawn through outlet 72 which also provides a convenient means to effect the desired vacuum in the apparatus by connecting outlet 72 to a suitable vacuum producing source.

When it is desired to concentrate or recover a labile material, such as for example an enzyme from a low boiling solvent containing the same, by means of the apparatus of the present invention, a water aspirator vacuum connected to the still at 72 is turned on and a coolant, such as chilled brine, circulated through coil 77 of condenser 70. Coil 77 being constructed of stainless steel or other corrosion resistant metal effects condensation of vapors which come in contact with the same.

When the desired vacuum is obtained, the solution containing the enzyme to be recovered, is permitted to flow through line 20 into the top entry injector 21, filling vessel 10 to approximately one half its capacity. Heating of the liquid in tubes 40 is then initiated, and continued by introducing steam into jackets 46. Heating of the liquid in circulation line 40 causes liquid in the top portion of the tube to be vaporized and then moving with feed by way of return line 50 into the central reservoir vessel 10. The vapor then moves off through the top of the vessel 10 into vessel 60, to be condensed in 70, and drained away by the aspirator connected to 70 at 72. As the liquid level in the reservoir falls due to vapor removal, i.e., concentration of the desired product, the liquid sensing device 15 at the liquid level tube 12 opens valve 19 by means of control 17 to deliver additional feed to vessel 10. The fresh feed added to the reservoir vessel mixes with the partially concentrated material in the still and enters the cycle induced by the heating and vaporization which takes place in tubes 40. The cycle described is thus repeated until a substantially concentrated product remains in the still which can then be conveniently withdrawn at 35.

Since many of the solutions from which recovery of unstable materials is desired have a tendency to foam, a reservoir maintained at the same pressure as that in vessel 60 can be provided above the vapor collecting vessel 60 to deliver an antifoam agent to vessel 10. A partial view of such means is shown by line 63, controlled by valve 64 which is positioned in neck 62 of vapor collecting vessel 60. Alternatively, the antifoam agent may be conveniently added with the feed delivered to vessel 10 via line 20.

When the concentration of product is complete, heat to the jackets 46 is discontinued; and the still permitted to operate until the jackets 46 and tubes 40 cool. The brine flow in the condenser is then stopped, and the still returned to atmospheric pressure. Product, free of undesired materials, is then withdrawn in line 35 under the control of valve 36.

While the apparatus shown in the drawing is generally depicted in a form suitable for laboratory installation and laboratory purposes, it is to be understood that the invention is not so limited. When used for laboratory purposes, however, the central reservoir may be in a volume size of from about 5 to about 20 liters for convenience. When constructed in a 5 liter size with appropriate proportioning of other components, distillation is effected at a rate of 3 to 6 liters per hour and at temperatures in the range of from 10 to 25° C. It will be seen that under these conditions even the most delicate enzyme compositions can be and are most effectively concentrated without degradation. The apparatus is particularly adapted for use in concentrating such materials as steroids, antibiotics, antitumor agents, antiviral agents and the like. Such materials either as aqueous solutions or in organic solvents, such as for example ethanol, acetone, chloroform or the like, can all be conveniently handled by the apparatus of the present invention in the manner described.

A typical run in the apparatus of the present invention follows:

Five liters of a 1% solution of penicillin G in pH 7.7 phosphate buffer (0.01 M) was hydrolyzed to 6-aminopenicillanic acid (6-APA) and phenylacetic acid by the amidase of *Alcaligenes faecalis*. The phenylacetic acid was extracted at pH 2.0 by isoamyl acetate. The resulting aqueous solution of 6-APA was adjusted to pH 3.0 and concentrated in a 5-liter automatic cyclic still. A ten-fold concentration from 5 liters to 0.5 liter was obtained in 1.5 hours at an operating temperature of 25° C. with a vacuum of 19 mm. Hg. Further concentration of the concentrate to 50 ml. on a small rotary evaporator resulted in the crystallization of 13.5 g. of pure 6-APA.

For convenience, modification may be made in the device as shown to simplify construction without departing from the essence of the invention as described. For example the inclined curved portion 32 can be made integral with circulation pipe 40 at the outer end in a continuous upwardly curved configuration thus obviating the closed end 33 as shown. Additionally, it may be found convenient to use an integral liquid level sensing device of the float type, either in the main vessel or the side tube, rather than the capacitance or photoelectric devices, which are preferred and which are encompassed within the types suggested by sensing device 15.

As will be readily apparent, the apparatus of the present invention provides by reason of its unique design an effective and inexpensive means of concentrating highly unstable materials without adversely affecting the same, in a susbtantially complete and automatic manner without the constant attention of an operator as required in conventional practice.

While the present invention has been described with some degree of particularity, it is understood that the same is not to be limited to the embodiment shown but is to be limited only by the claim appended hereto.

The invention claimed is:

An automatic vacuum still comprising a reservoir vessel, a fluid inlet line connected to said vessel at a point above the normal level of liquid maintained in said vessel, a downwardly extending liquid draw off line connected to the bottom of said vessel, said draw off line terminating in an upwardly inclined portion which is closed at the outer end thereof, a product draw off line in the liquid draw off line positioned at the low point at which the draw off line begins its upward incline, at least one liquid circulation induction line, vertically positioned outside the vessel, connected at its lower end to the upward inclined portion of the liquid draw off line and at its upper end to a fluid return line, a heating jacket surrounding said induction line, means to introduce and withdraw heating fluid from said jacket, said fluid return line being generally perpendicular to said circulation line, closed at its outer end and communicating with the interior of the vessel at its inner end, said return line being positioned generally to straddle the point at which a liquid level is maintained in the vessel, a vapor condenser connected to and in communication with the upper end of said vessel, a vertical, U-shaped, transparent, liquid level side tube having its ends in fluid communication with said vessel, positioned to show liquid level in said vessel, a liquid level sensing element external of said U-tube positioned to sense liquid level in said U-tube, control means connected to said sensing element and responsive thereto, said control means being connected to a valve responsive to the control means to regulate fluid flow in the fluid inlet line, a vapor collecting chamber overlying the reservoir vessel and directing vapors from said vessel to the condenser, and including an antifoam chamber connected through a valve cotrolled conduit with said vapor collecting chamber for introducing antifoam material thereto.

References Cited by the Examiner

UNITED STATES PATENTS

| 236,940 | 1/1881 | Faesch. | |
|---|---|---|---|
| 2,310,399 | 12/1943 | Cox et al. | 202—205 X |
| 2,320,853 | 6/1943 | Delahanty | 202—181 X |
| 2,642,386 | 6/1953 | Piros | 203—100 X |
| 3,214,352 | 10/1965 | Wells | 202—205 X |

NORMAN YUDKOFF, *Primary Examiner.*

F. E. DRUMMOND, *Assistant Examiner.*